United States Patent [19]

Weinhold

[11] 3,979,143

[45] Sept. 7, 1976

[54] DEVICE FOR DETACHABLY FASTENING HOSE OR PIPE ENDS

[76] Inventor: Karl Weinhold, Im Jagdfeld 43, 4040 Neuss, Germany

[22] Filed: Aug. 8, 1975

[21] Appl. No.: 603,018

Related U.S. Application Data

[63] Continuation of Ser. No. 463,034, April 22, 1974, abandoned.

[30] Foreign Application Priority Data

Apr. 25, 1973 Germany.............................. 2320815

[52] U.S. Cl.................................. 285/243; 285/409
[51] Int. Cl.².......................................... F16L 33/12
[58] Field of Search .......... 285/243, 409, 419, 373, 285/114, 365, 407, 408; 24/270, 271, 273

[56] References Cited
UNITED STATES PATENTS

| | | | |
|---|---|---|---|
| 3,206,230 | 9/1965 | Weinhold........................ | 285/243 X |
| 3,272,536 | 9/1966 | Weinhold........................ | 285/243 X |
| 3,475,793 | 11/1969 | Oetiker............................. | 24/271 X |

FOREIGN PATENTS OR APPLICATIONS

| | | | |
|---|---|---|---|
| 23,170 | 4/1936 | Australia............................... | 24/270 |
| 598,429 | 9/1925 | France................................... | 24/270 |

*Primary Examiner*—Dave W. Arola
*Attorney, Agent, or Firm*—Sherman & Shalloway

[57] ABSTRACT

A device for detachably fastening hose or pipe ends comprises a plurality of curved part shells, the adjacent ends of two of which are connected by a clamping lever lock and the remaining adjacent ends of which are flexibly connected together, a clamping lever of the clamping lever lock being flexibly mounted on the first of the said two part shells and a spring of the clamping lever lock being mounted on the lever and acting on the second of the two part shells, the second shell having a bridging-piece for hooking into an inner side of the first part shell.

7 Claims, 4 Drawing Figures

3,979,143

DEVICE FOR DETACHABLY FASTENING HOSE OR PIPE ENDS

This is a continuation of Application Ser. No. 463,034, filed Apr. 22, 1974 now abandoned.

BACKGROUND OF THE INVENTION

The invention relates to a device for detachable fastening of hose or pipe ends.

Such a device may comprise at least two part shells which are flexibly connected to each other at their ends and provided on their sides with flanges directed radially inwards for pressing a hose end against a socket and/or for gripping behind an annular collar on a pipe end, and with a clamping lever lock connecting the adjoining ends of two part shells, the clamping lever being flexibly secured to the first of these part shells, whereas a spring secured to the clamping lever acts on the second part shell.

In a device of this type, the part shells are held together in the peripheral direction by the spring, i.e., the spring is not only stressed by the force required for holding the part shells together, but also by other forces, which may stress the device in the radial or peripheral direction. In a device for securing a hose end on a socket these forces are the radial contact forces required for pressing on the hose end. However, unforeseen radial stresses may also occur during connection of two rigid pipe ends, e.g., as a result of inaccurate outside diameters of the pipe ends or dirt on the supporting areas of the flanges. Such forces may also be caused by other effects, e.g., hooking of the device on an obstacle. In every case the spring may be subjected to particularly heavy stresses, viz., not only temporarily, but even continously if the above-mentioned dimensional inaccuracies or dirt are present.

SUMMARY OF THE INVENTION

It is an object of the invention to provide a device for detachably fastening hose or pipe ends such that unforeseeable loads are largely kept away from the spring when the device is closed.

According to the invention, there is provided a device for detachably fastening hose or pipe ends comprising a plurality of curved part shells, a clamping lever lock for connecting adjacent ends of first and second part shells and including a clamping lever flexibly secured to said first part shell and a spring secured to said clamping lever and acting on said second part shell, a bridging-piece on said second part shell for hooking into an inner side of said first part shell when said device is closed, means for flexibly connecting the remaining adjacent edges of said plurality of part shells and engagement means on said part shells for engaging said hose or pipe ends.

BRIEF DESCRIPTION OF THE DRAWINGS

One embodiment of the invention will now be described, by way of example, with reference to the drawings, in which.

DESCRIPTION OF THE PREFERRED EMBODIMENT

Figure 1:
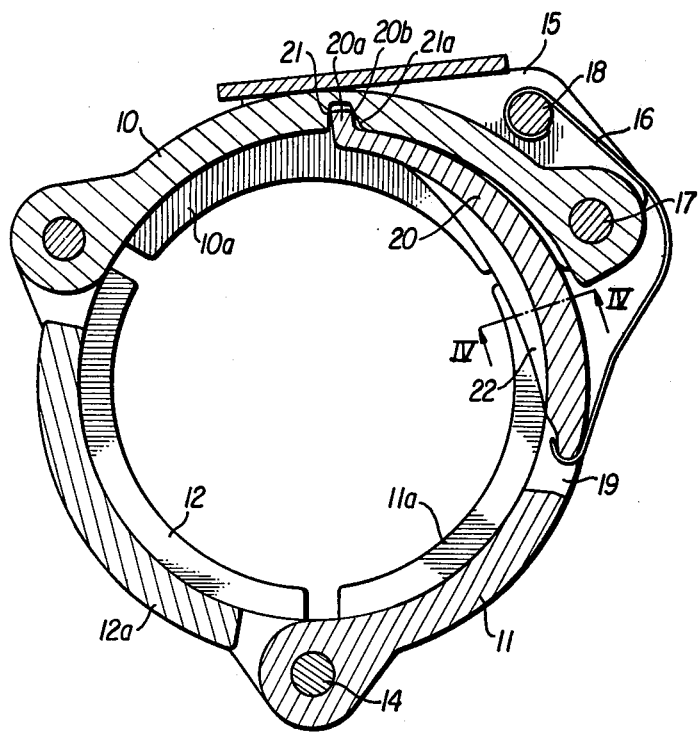
FIG. 1 shows a cross-section through a device according to this embodiment.

Basically, the invention proposes, in a preferred embodiment applied to the type of device described earlier, that the second part shell, on which the spring acts, be provided with a bridging-piece which hooks on to the inner side of the first part shell when the device is closed.

The hooking of the bridging-piece of the second part shell on to the first part shell produces a positive engagement, which can be stressed in the peripheral direction when the device is closed and can absorb all stresses acting in this direction. The spring itself is stressed only by the forces normally required for closing the device. Hence the operational reliability and life of the device are increased and more favourable prerequisites created for the dimensioning the spring itself.

Several advantageous refinements of the invention are described below. One refinement consists in providing the bridging-piece with a projection extending radially outwards, which engages in a recess on the inner side of the first part shell. It is also advantageous if the bridging-piece is curved in its longitudinal direction and is reinforced on its inner side by a substantially segment-shaped rib.

It is quite conceivable to allow the hook to act on the first part shell in the area of the connecting bolt connecting the clamping lever to the first part shell. However, better conditions are created for transmission of forces acting in the peripheral direction through the bridging-piece if, according to a further proposed form of the invention, the hooking point is located roughly in the central third of the curve of the first part shell and if the bridging-piece runs on the inner side of the latter to this point.

The position and shape of the bridging-piece projection extending radially outwards will have to be adapted to the movement of the part shells towards each other when the device closes. To achieve satisfactory and easy engagement of the projection in the recess on the inner side of the first part shell, it is advantageous according to a further proposed form of the invention if the side of the hook-shaped projection of the bridging-piece opposite the end of the bridging-piece and the recess wall facing this side are inclined in relation to the radial direction, so that an angle between 100° and 150° is formed at the transition to the outer side of the bridging-piece and to the inner side of the first part shell respectively. The inclination of the above-mentioned sides is then just sufficient to ensure that the projection engages easily in the recess, while the positive engagement between the bridging-piece and the first part shell is always sufficient to absorb the above-mentioned stresses.

It is advantageous if the first part shell projects slightly outwards in the area of the connecting bolt holding the clamping lever, viz., so far that the axis of the connecting bolt is located on a larger radius than the outer sides of the bridging-piece and its part shell.

The device may consist of two or more part shells. According to the number of part shells, different paths of motion result for the part shells which are to be connected by the hook when the device is closed. The shape and position of the bridging-piece or its projection and the recess in the first part shell should be adapted to these paths.

Referring now to the drawings, the device consists of three part shells 10, 11 and 12, which are provided on both sides with flanges 10a, 11a and 12a directed radially inwards. The part shells 10 and 12 are connected to each other by a connecting bolt 13 and the part shells 12 and 11 by a connecting bolt 14. A clamping lever lock comprises a clamping lever 15 and a spring 16. The clamping lever 15 is held by a connecting bolt 17 on the first of the part shells 10 to be connected to each other by the clamping lever lock, whereas the spring 16 is mounted by a further connecting bolt 18 on the clamping lever 15. The other end of the spring 16 is hooked into the second of part shells 11 to be connected, which is provided with a slot 19 for this purpose.

The second part shell 11 has a bridging-piece 20 extending in the peripheral direction, which continues in its central axial portion, the curve of the part shell 11 and extends to about half the curve length of the first part shell 10 when the device is closed. The bridging-piece 20 is provided at its free end with a hook-shaped projection 20a, which is directed radially outwards and engages in a suitably shaped recess 21 on the inner side of the first part shell 10. On the side opposite its free front face, the projection 20a has an inclined surface 20b, which forms an angle of about 120° with a tangent at the transition with the curved outer surface of the bridging-piece 20. The wall 21a of recess 21 facing the inclined surface 20b is suitably inclined.

A rib 22 runs along the inner side of the bridging-piece 20. Its inward-facing side roughly corresponds to the path of a chord of part of the arc formed by the part shell 11 and its bridging-piece 20, so that the rib 22 resembles a segment when viewed in the axial direction of the device.

The rib 22 runs in one direction, over more than half the length of the bridging-piece 20 and, in the other direction, along the inner side of the part shell 11. The rib 22 thus provides an effective reinforcement in the area of the transition between part shell 11 and bridging-piece 20.

The part shell 10 projects so far outwards in the area of the connecting bolt 17 that the bridging-piece 20 can run on the inner side of the part shell 10 without projecting inwardly beyond the line delimited by flanges 10a, 11a, and 12a. Accordingly, the position of the connecting bolt 17 is such that its axis is located on a radius outside the outer periphery of the part shell 11.

Figure 2:
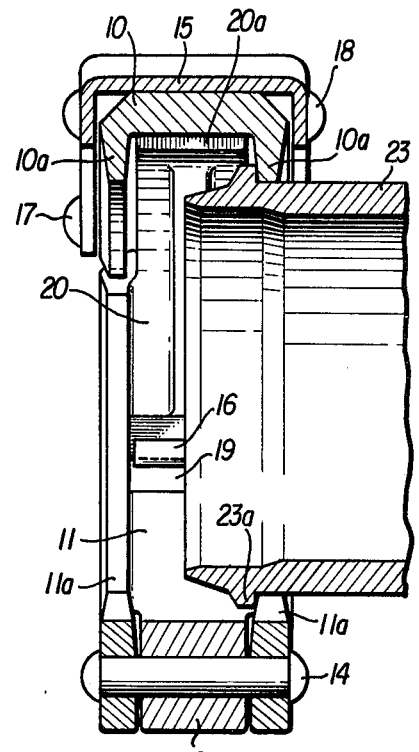
FIG. 2 is a longitudinal section taken along the line II — II of FIG. 1.
Figure 3:
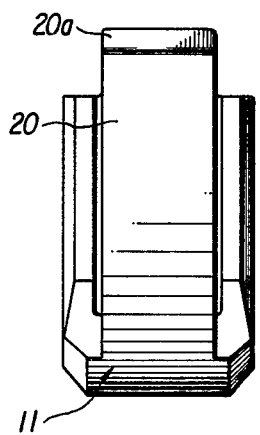
FIG. 3 is a side view of the second part shell with the bridging-piece.
Figure 4:
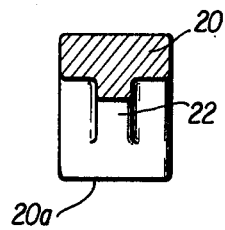
FIG. 4 is a section taken along the line IV — IV of FIG. 1 through the bridging-piece of the second part shell.

The device described here is used for connection of two rigid pipe ends 23, only one of which is shown in FIG. 2. In the region of their front faces the pipe ends 23 have annular collars 23a extending radially outwards, which are overlapped by the flanges 10a, 11a and 12a when the device is closed.

After the part shells 10, 11 and 12 have been placed round the pipe ends 23, the spring 16 is hooked into the slot 19 with the clamping lever 15 swung outwards. When the clamping lever 15 is closed the part shells 10 and 11 move towards each other, whereby the projection 20a of the bridging-piece 20 approaches the recess 21 in the part shell 10. When the final closing position is reached the projection 20a engages in the recess 21, so that a positive connection between the part shells 10 and 11 is also established in the peripheral direction. All forces which represent additional loads acting in this direction can be absorbed via this connection. The spring 16 remains loaded essentially only by the normal clamping force.

It will be understood that the above description of the present invention is susceptible to various modifications changes and adaptations.

What is claimed is:

1. A device for releasable attachment of the ends of hoses and pipes comprising at least two partial shells having a radial flange at each edge and means pivotally connecting, said partial shells together, clamping means for clamping said partial shells together, said clamping means including a first peripheral lock for connecting a first and a second of said partial shells, said first lock including a clamping lever hinged to said first partial shell and a spring mounted on said first partial shell and engageable with said second partial shell for clamping said first and second partial shells, said clamping means including a rigid second peripheral lock for connecting said first and second partial shells and including a rigid bridge member integral with said second partial shell, said bridge member being extended radially inwardly of said first partial shell in the closed position of the device, and abutment means on said first partial shell and bridge member for rigid connection of said first shell and said bridge member in the fully closed position of the device.

2. The apparatus of claim 1 in which said abutment means includes a radially outwardly extending projection on said bridge member and a recess in said first partial shell positioned to receive said projection.

3. A device as claimed in claim 2, wherein said bridging-piece comprises a member curved in its longitudinal direction and a substantially segment shaped rib positioned on an inner side of said member for reinforcing said member.

4. A device defined in claim 2, wherein said first partial shell has said recess in the middle third portion there of and said bridging-piece extends along the inside of said first partial shell to said recess.

5. A device as defined in claim 2, wherein said radially outwardly extending projection on said bridging-piece includes a surface away from an adjacent free end of said bridging-piece which is inclined relative to a radius of said device at said radially outwardly extending projection to narrow said radially outwardly extending projection and mating with an wall of said recess.

6. A device as defined in claim 5, wherein said mating surfaces defined by said bridging-piece and said wall of said recess define an angle of between 100° and 150° respectively with an outer side of said bridging-piece and an inner side of said first partial shell.

7. A device as defined in claim 2 comprising a connecting bolt for pivotal attachment of said clamping lever to said first partial shell and located on a larger radius of said device than said bridging-piece and said second partial shell.

* * * * *